United States Patent [19]

Volkert

[11] Patent Number: 5,290,823
[45] Date of Patent: Mar. 1, 1994

[54] PRODUCTION OF RIGID POLYURETHANE FOAMS, AND A BLOWING AGENT MIXTURE FOR THIS PURPOSE

[75] Inventor: Otto Volkert, Weisenheim, Fed. Rep. of Germany

[73] Assignee: BASF Aktiengesellschaft, Ludwigshafen, Fed. Rep. of Germany

[21] Appl. No.: 3,088

[22] Filed: Jan. 11, 1993

[30] Foreign Application Priority Data

Jan. 11, 1992 [DE] Fed. Rep. of Germany ....... 4200558

[51] Int. Cl.$^5$ .............................................. C08J 9/14
[52] U.S. Cl. ...................................... 521/131; 521/170
[58] Field of Search ................................ 521/131, 170

[56] References Cited

U.S. PATENT DOCUMENTS

| | | | |
|---|---|---|---|
| 5,084,487 | 1/1992 | Becker et al. | 521/159 |
| 5,096,933 | 3/1992 | Volkert | 521/131 |
| 5,122,547 | 6/1992 | Becker et al. | 521/159 |
| 5,153,235 | 10/1992 | Becker et al. | 521/159 |
| 5,162,385 | 11/1992 | Hartwig et al. | 521/130 |
| 5,187,206 | 2/1993 | Volkert et al. | 521/131 |

*Primary Examiner*—Morton Foelak
*Attorney, Agent, or Firm*—Dennis V. Carmen

[57] ABSTRACT

The invention relates to a process for the production of rigid polyurethane foams using a specific blowing agent mixture of highly fluorinated and/or perfluorinated organic compounds, cyclopentane and, if desired, aliphatic and/or further cycloaliphatic hydrocarbons having 4 to 8 carbon atoms.

13 Claims, No Drawings

PRODUCTION OF RIGID POLYURETHANE FOAMS, AND A BLOWING AGENT MIXTURE FOR THIS PURPOSE

The present invention relates to a process for the production of rigid polyurethane foams using a specific blowing agent mixture. The present invention furthermore relates to these specific blowing-agent mixtures for the production of rigid polyurethane foams.

The production of rigid polyurethane foams by reacting organic polyisocyanates and/or modified organic polyisocyanates with higher-functional compounds containing at least two reactive hydrogen atoms, for example polyoxyalkylenepolyamines and/or preferably organic polyhydroxyl compounds having molecular weights of, for example, from 500 to 12 000, and, if desired, chain extenders and/or crosslinking agents having molecular weights of up to approximately 400 in the presence of catalysts, blowing agents, assistants and/or additives is known and has been described many times. A review on the production of rigid polyurethane foams is given, for example, in Kunststoff-Handbuch, Volume VII, Polyurethane, 1st Edition, 1966, edited by Dr. R. Vieweg and Dr. A. Höchtlen, and 2nd Edition, 1983, edited by Dr. G. Oertel (Carl. Hanser Verlag, Munich).

Essentially two types of blowing agent are used to produce rigid polyurethane foams:

Low-boiling, inert liquids which evaporate under the conditions of the exothermic polyaddition reaction, preferably halogenated hydrocarbons, such as methylene chloride, trichlorofluoromethane, inter alia, and chemical compounds which form the blowing gases by a chemical reaction or by thermal decomposition. A specific example is the reaction of water with isocyanates to form amines and carbon dioxide, which proceeds synchronously with the polyurethane formation, and the cleavage of thermally labile compounds, for example azobisisobutyronitrile, which gives toxic tetramethylsuccinonitrile in addition to nitrogen as cleavage products, or azodicarbonamide, whose use as a constituent of a blowing agent combination is described in EP-A-0 092 740 (CA 1 208 912). While the last-mentioned method, in which thermally labile compounds, e.g. azo compounds, hydrazides, semicarbazides, N-nitroso compounds, benzoxazines, inter alia (Kunststoffe 66 (1976), 10, pages 698 to 701), are usually incorporated into a preprepared polymer, has remained of secondary importance industrially, the low-boiling liquids which act physically, in particular chlorofluoroalkanes, are used on a large scale worldwide as a blowing agent for the production of polyurethane or polyisocyanurate foams. However, these blowing agents have the disadvantage of polluting the environment. By contrast, the formation of blowing gases by thermal cleavage or chemical reaction is accompanied by the formation of cleavage products and/or reactive byproducts which are included or chemically bonded into the polyaddition product and can result in an undesired change in the mechanical properties of the plastic. In the case of the formation of carbon dioxide from water and isocyanate, urea groups are formed in the polyaddition product which can result in an improvement in the compressive strength as far as causing embrittlement of the polyurethane, depending on their amount.

According to EP-A-351 614, other blowing agents which can be used for the production of polyurethane foams are fluorinated hydrocarbons, perfluorinated hydrocarbons, sulfur hexafluoride or mixtures of at least two of these compounds. Since these fluorinated or perfluorinated blowing agents are only sparingly soluble or insoluble in the formative components for the preparation of the polyisocyanate polyaddition products, they are emulsified in at least one organic and/or modified organic polyisocyanate, at least one relatively high-molecular-weight compound containing at least two reactive hydrogen atoms or in a mixture of at least one relatively high-molecular-weight compounds containing at least two reactive hydrogen atoms and a low-molecular-weight chain extender and/or crosslinking agent. This method allows cellular plastics having a uniform and fine cell structure to be prepared. The principle disadvantage here is the high price of these blowing agents. Preparation of cellular plastics having a particularly advantageous cell structure severely restricts the choice to mixtures of perfluoropentane and perfluorohexane.

It is also possible to use alkanes, such as butane, pentane, inter alia, as blowing agent. DE-A-3 933 335 proposes the use of cyclopentane. The foams produced therewith have a relatively coarse, not always uniform cell structure and increased thermal conductivity.

It is furthermore known to employ mixtures of perfluoro compounds and other low-boiling organic compounds as blowing agents in the production of rigid polyurethane foams.

Thus, US-A-4,981,879 describes mixtures of perfluoroalkanes with all organic compounds which have a boiling point of from −50° to +100° C. Various compounds, some quite different chemically, are listed therein, the use of trichlorofluoromethane being mentioned as the preferential variant. The working examples also only describe the use of trichloromonofluoromethane. However, the object of avoiding the use of such blowing agents for environmental protection reasons is thus not achieved.

EP-A-0 405 439 mentions the combination of perfluoroalkanes with cycloalkanes, but the cycloalkane content given is lower than the proportion of the perfluoroalkane compound. The small blowing effect of this blowing agent mixture requires a high water content of the polyol component, which is greater than 3%. Polyurethane foams produced in this way have lower thermal insulation and poorer mechanical properties, in particular greater brittleness and poorer adhesion, than foams produced using conventional blowing agents.

It is an object of the present invention to provide a process for the production of rigid polyurethane foams in which the use of environmentally harmful chlorofluorocarbons as blowing agent can be substantially avoided and which gives fine-cell foams having improved properties, for example lower thermal conductivity and improved mechanical properties, in particular improved adhesion.

We have found that, surprisingly, this object is achieved by using a blowing agent mixture comprising from 5 to 40 % by weight of highly fluorinated and/or perfluorinated organic compounds, in particular hydrocarbons, from 30 to 95% by weight of cyclopentane and from 0 to 45% by weight of aliphatic and/or further cycloaliphatic hydrocarbons having 4 to 8 carbon atoms in the process for the production of rigid polyurethane foams, where the water content in the polyol is, in particular, from 0.5 to 3% by weight, based on the polyol component.

The present invention accordingly provides a process for the production of rigid polyurethane foams by reacting
 a) organic and/or modified organic polyisocyanates with
 b) at least one relatively high-molecular-weight compound containing at least two reactive hydrogen atoms, and, if desired,
 c) low-molecular-weight chain extenders and/or cross-linking agents,
in the presence of
 d) blowing agents,
 e) catalysts and, if desired,
 f) assistants and/or additives,
comprises using, as blowing agent (d), a mixture of
 (d1) from 5 to 40% by weight of at least one highly fluorinated and/or perfluorinated organic compound,
 (d2) from 30 to 95% by weight of cyclopentane and
 (d3) from 0 to 45% by weight of at least one aliphatic and/or further cycloaliphatic hydrocarbon having 4 to 8 carbon atoms, where said percentages by weight are based on the sum of (d1)+(d2)+(d3).

The present invention also provides blowing agent mixtures for the production of rigid polyurethane foams, comprising
 (d1) from 5 to 40% by weight of at least one highly fluorinated and/or perfluorinated hydrocarbon,
 (d2) from 30 to 95% by weight of cyclopentane and
 (d3) from 0 to 45% by weight of at least one aliphatic and/or cycloaliphatic $C_4$–$C_8$-hydrocarbon, preferably a linear and/or branched aliphatic hydrocarbon.

The blowing agent mixtures (d) to be used according to the invention preferably contain the cyclopentane (d2) in an amount of from 40 to 90% by weight, based on the sum of components (d1) to (d3), i.e. the blowing agent mixture (d). If the blowing agent mixtures (d) to be used according to the invention comprise only the highly fluorinated and/or perfluorinated organic compounds (d1) and cyclopentane (d2), the components are in the blowing agent mixture (d) in, in particular, a (d1):(d2) mixing ratio of from 10:90 to 40:60% by weight. If the blowing agent mixtures (d) to be used according to the invention also contain at least one aliphatic and/or further cycloaliphatic $C_4$–$C_8$-hydrocarbon (d3) in addition to components (d1) and (d2), this component (d3) is generally present in an amount of at least 5% by weight, preferably 10% by weight, based on the total blowing agent mixture (d).

From the prior art, in particular EP-A-0 405 439, a person skilled in the art would have expected that an increase in the cycloalkane/alkane proportion relative to the perfluorinated hydrocarbons in the blowing agent mixtures for the production of rigid polyurethane foams would give rigid polyurethane foams having impaired properties, in particular with respect to cell structure, adhesion and insulation properties.

However, it has been found that, surprisingly, the rigid polyurethane foams produced using the blowing agent mixture according to the invention are fine-celled foams having very good adhesion to covering layers. In addition, their thermal conductivity is significantly lower than that of the foams produced in accordance with EP-A-0 405 439. The rigid polyurethane foams produced according to the invention are therefore particularly suitable for use in the refrigeration equipment industry.

Particularly good foams are obtained if a mixture of highly fluorinated and/or perfluorinated alkanes with cyclopentane and linear and/or branched aliphatic $C_4$–$C_8$-hydrocarbons is used as the blowing agent mixture.

In a production of the rigid polyurethane foams, the blowing agent mixtures according to the invention are usually employed in an amount of from 2 to 25% by weight, preferably from 5 to 15% by weight, based on component (b) employed in the production of the rigid polyurethane foams, i.e. the relatively high-molecular-weight compound containing at least two reactive hydrogen atoms.

In order to extend the processing range with respect to the reaction parameters and foaming equipment and an increase in the processing reliability, together with a reduction in the formation of industrially useless foam waste, it has proven advantageous to use the blowing agent mixture (d) according to the invention in combination with water as an additional blowing agent. Depending on the foam density desired and on the amount of blowing agent mixture employed, the water contents, based on component (b) are expediently greater than 0.1% by weight, preferably from 0.5 to 3% by weight.

The following details apply to the individual components of the blowing agent mixture (d) to be employed according to the invention:

The following, for example, are suitable as component (d1), i.e. the fluorinated or perfluorinated organic compound: fluorinated or perfluorinated, linear or cyclic ethers having 4 to 12 carbon atoms, preferably 4 to 6 carbon atoms, e.g. perfluorodiethyl ether, perfluorodipropyl ether and perfluoroethyl propyl ether, oligomers of perfluoroethylene oxide, of perfluoropropylene oxide or mixed perfluoroethylene/perfluoropropylene oxides and cyclic perfluoro ethers, e.g. perfluorotetrahydrofuran or perfluoroalkyltetrahydrofurans, and fluorinated or perfluorinated tertiary alkylamines having 1 to 5 carbon atoms, preferably 2 to 4 carbon atoms, in the alkyl radical, e.g. perfluorotriethylamine, perfluorotripropylamine or perfluorotributylamine, and aliphatic or cycloaliphatic perfluoroalkanes which are gaseous at room temperature, e.g. perfluoropropane, perfluorobutane or perfluorocyclobutane, which can be liquefied, mixed and emulsified under pressure, for example at a pressure of up to approximately 25 bar.

Compounds which have proven highly successful and are therefore preferably used as the blowing agent component (d1) are aliphatic or cycloaliphatic, partially fluorinated or perfluorinated hydrocarbons having 3 to 8 carbon atoms, preferably 5 or 6 carbon atoms, which are liquid at room temperature. Specific examples which may be mentioned of (per)fluorinated hydrocarbons of this type are perfluoropentane, perfluorohexane, perfluoroheptane, perfluorooctane, perfluorocyclopentane, perfluorocyclohexane, hexafluoropropane and heptafluoropropane. Preference is given to perfluoropentane and in particular perfluorohexane, and mixtures thereof. The fluorinated organic compounds employed are expediently those which are predominantly fluorinated, for example to the extent of at least 85%, but contain at least one, preferably only one, bonded hydrogen atom.

The (per)fluorinated organic compounds (d1) which are suitable according to the invention, are only sparingly soluble or insoluble in the formative components for the preparation of the rigid polyurethane foams and expediently have a maximum boiling point of 150° C., preferably from 40° to 80° C., may be used individually or in the form of mixtures with one another.

Component (d3) of the blowing agent mixtures to be employed according to the invention may be a further cycloalkane, e.g. cyclohexane, or, in particular, linear and/or branched alkanes having 4 to 8 carbon atoms, such as butane, pentane, hexane, heptane or octane. Linear and/or branched alkanes having 5 or 6 carbon atoms, in particular n-pentane, isopentane, isomeric pentane mixtures or isohexane, have proven particularly advantageous.

The rigid polyurethane foams are produced by reacting, in a manner known per se, a) organic and/or modified organic polyisocyanates with b) at least one relatively high-molecular-weight compound containing at least two reactive hydrogen atoms, and, if desired, c) low-molecular-weight chain extenders and/or cross-linking agents, in the presence of d) the blowing agent mixture according to the invention and in the presence of e) catalysts and, if desired, f) conventional further assistants and/or additives.

The rigid polyurethane foams are prepared by the process according to the invention using, with the exception of the blowing agents (d), the formative components which are known per se, to which the following details apply:

a) Suitable organic polyisocyanates are conventional aliphatic, cycloaliphatic, araliphatic and preferably aromatic polyisocyanates.

The following may be mentioned as examples: alkylene diisocyanates having from 4 to 12 carbon atoms in the alkylene moiety, such as 1,12-dodecane diisocyanate, 2-ethyltetramethylene 1,4-diisocyanate, 2-methylpentamethylene 1,5-diisocyanate, tetramethylene 1,4- diisocyanate and preferably hexamethylene 1,6-diisocyanate; cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (isophorone diisocyanate), 2,4- and 2,6-hexahydrotolylene diisocyanate, and the corresponding isomer mixtures, 4,4'-, 2,2'- and 2,4'-dicyclohexylmethane diisocyanate and the corresponding isomer mixtures, and preferably aromatic diisocyanates and polyisocyanates, e.g. 2,4- and 2,6-tolylene diisocyanate and the corresponding isomer mixtures, 4,4'-, 2,4'- and 2,2'-diphenylmethane diisocyanate and the corresponding isomer mixtures, mixtures of 4,4'- and 2,4'-diphenylmethane diisocyanates, polyphenyl-polymethylene polyisocyanates, mixtures of 4,4'-, 2,4'- and 2,2'-diphenylmethane diisocyanates and polyphenyl-polymethylene polyisocyanates (crude MDI), and mixtures of crude MDI and tolylene diisocyanates. The organic diisocyanates and polyisocyanates may be employed individually or in the form of mixtures.

Frequently, modified polyisocyanates are also used, i.e. products which are obtained by chemical reaction of organic diisocyanates and/or polyisocyanates. Specific examples are ester-, urea-, biuret-, allophanate-, carbodiimide-, isocyanurate-, uretdione- and/or urethane-containing diisocyanates and/or polyisocyanates. Individual examples are urethane-containing organic, preferably aromatic, polyisocyanates containing from 33.6 to 15% by weight, preferably from 31 to 21% by weight, of NCO, based on the total weight, for example 4,4'-diphenylmethane diisocyanate, 4,4'- or 2,4'-diphenylmethane diisocyanate mixtures, crude MDI or 2,4- or 2,6-tolylene diisocyanate modified by means of low-molecular-weight diols, triols, dialkylene glycols, trialkylene glycols or polyoxyalkylene glycols having molecular weights of up to 6000, in particular up to 1500, specific examples of di- and polyoxyalkylene glycols, which can be employed individually or as mixtures, being diethylene glycol, dipropylene glycol, polyoxyethylene glycol, triol and/or tetrol, polyoxypropylene glycol, triol and/or tetrol and polyoxypropylene-polyoxyethylene glycol, triol and/or tetrol. NCO-containing prepolymers containing from 25 to 3.5% by weight, preferably from 21 to 14% by weight, of NCO, based on the total weight, and prepared from the polyester- and/or preferably polyether-polyols described below and 4,4'-diphenylmethane diisocyanate, mixtures of 2,4'- and 4,4'-diphenylmethane diisocyanate, 2,4- and/or 2,6-tolylene diisocyanates or crude MDI are also suitable. Furthermore, liquid polyisocyanates containing carbodiimide groups and/or isocyanurate rings and containing from 33.6 to 15% by weight, preferably from 31 to 21% by weight, of NCO, based on the total weight, e.g. based on 4,4'-, 2,4'- and/or 2,2'-diphenylmethane diisocyanate and/or 2,4- and/or 2,6-tolylene diisocyanate, have also proven successful.

The modified polyisocyanates may be mixed with one another or with unmodified organic polyisocyanates, e.g. 2,4'- or 4,4'-diphenylmethane diisocyanate, crude MDI or 2,4- and/or 2,6-tolylene diisocyanate.

Organic polyisocyanates which have proven particularly successful and are therefore preferably used are mixtures of tolylene diisocyanates and crude MDI or mixtures of modified urethane group-containing organic polyisocyanates containing from 33.6 to 15% by weight of NCO, in particular those based on tolylene diisocyanates, 4,4'-diphenylmethane diisocyanate, diphenylmethane diisocyanate isomer mixtures or crude MDI and in particular crude MDI containing from 30 to 80% by weight, preferably from 30 to 55% by weight, of diphenylmethane diisocyanate isomers.

b) The relatively high-molecular-weight compound (b) containing at least two reactive hydrogen atoms expediently has a functionality of from 2 to 8, preferably from 2 to 6, and a molecular weight of from 400 to 8000, preferably from 1200 to 6000. Particular success has been achieved using, for example, polyetherpolyamines and/or preferably polyols selected from the group comprising the polyether-polyols, polyesterpolyols, polythioether-polyols, polyester-amides, hydroxyl-containing polyacetals and hydroxyl-containing aliphatic polycarbonates, or mixtures of at least two of said polyols. Particular preference is given to polyester-polyols and/or polyether-polyols. The hydroxyl number of the polyhydroxyl compounds is generally from 150 to 850, preferably from 200 to 600.

Suitable polyester-polyols may be prepared, for example, from organic dicarboxylic acids having from 2 to 12 carbon atoms, preferably aliphatic dicarboxylic acids having from 4 to 6 carbon atoms and polyhydric alcohols, preferably diols, having from 2 to 12 carbon atoms, preferably from 2 to 6 carbon atoms. Examples of suitable dicarboxylic acids are succinic acid, glutaric acid, adipic acid, suberic acid, azelaic acid, sebacic acid, decanedicarboxylic acid, maleic acid, fumaric acid, phthalic acid, isophthalic acid and terephthalic acid.

The dicarboxylic acids may be used either individually or mixed with one another. The free dicarboxylic acids may also be replaced by the corresponding dicarboxylic acid derivatives, for example dicarboxylic acid esters of alcohols having 1 to 4 carbon atoms or dicarboxylic anhydrides. Preference is given to dicarboxylic acid mixtures comprising succinic acid, glutaric acid and adipic acid in ratios of, for example, from 20 to 35 : 35 to 50 : 20 to 32 parts by weight, and in particular adipic acid. Examples of dihydric and polyhydric alcohols, in particular diols, are ethanediol, diethylene glycol, 1,2- and 1,3-propanediol, dipropylene glycol, 1,4-butanediol, 1,5-pentanediol, 1,6-hexanediol, 1,10-decanediol, glycerol and trimethylolpropane. Preference is given to ethanediol, diethylene glycol, 1,4-butanediol, 1,5-pentanediol, 1,6-hexanediol and mixtures of at least two of said diols, in particular mixtures of 1,4-butanediol, 1,5-pentanediol and 1,6-hexanediol. Furthermore, polyester-polyols made from lactones, e.g. ε-caprolactone or hydroxycarboxylic acids, e.g. ω-hydroxycaproic acid, may also be employed.

The polyester-polyols may be prepared by polycondensing the organic, e.g. aromatic and preferably aliphatic polycarboxylic acids and/or derivatives thereof and polyhydric alcohols without using a catalyst or preferably in the presence of an esterification catalyst, expediently in an inert gas atmosphere, e.g. nitrogen, carbon monoxide, helium, argon, inter alia, in the melt at from 150° to 250° C., preferably from 180° to 220° C., at atmospheric pressure or under reduced pressure until the desired acid number, which is advantageously less than 10, preferably less than 2, is reached. In a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, has been reached. Examples of suitable esterification catalysts are iron, cadmium, cobalt, lead, zinc, antimony, magnesium, titanium and tin catalysts in the form of metals, metal oxides or metal salts. However, the polycondensation may also be carried out in the liquid phase in the presence of diluents and/or entrainers, e.g. benzene, toluene, xylene or chlorobenzene, for removal of the water of condensation by azeotropic distillation.

The polyester-polyols are advantageously prepared by polycondensing the organic polycarboxylic acids and/or derivatives thereof with polyhydric alcohols in a molar ratio of from 1:1 to 1.8, preferably from 1:1.05 to 1.2.

The polyester-polyols obtained preferably have a functionality of from 2 to 4, in particular from 2 to 3, and a molecular weight of from 480 to 3000, preferably from 1200 to 3000, in particular from 1800 to 2500.

However, the preferred polyols are polyetherpolyols prepared by conventional processes, for example by anionic polymerization using alkali metal hydroxides, such as sodium hydroxide or potassium hydroxide, or alkali metal alkoxides, such as sodium methoxide, sodium ethoxide, potassium ethoxide or potassium isopropoxide as catalysts and with addition of at least one initiator molecule containing from 2 to 8, preferably from 2 to 6, reactive hydrogen atoms in bound form, or by cationic polymerization using Lewis acids, such as antimony pentachloride, boron fluoride etherate, inter alia, or bleaching earth as catalysts, from one or more alkylene oxides having from 2 to 4 carbon atoms in the alkylene moiety.

Examples of suitable alkylene oxides are tetrahydrofuran, 1,3-propylene oxide, 1,2- and 2,3-butylene oxide, styrene oxide and preferably ethylene oxide and 1,2-propylene oxide. The alkylene oxides may be used individually, alternately one after the other or as mixtures. Examples of suitable initiator molecules are water, organic dicarboxylic acids, such as succinic acid, adipic acid, phthalic acid and terephthalic acid, aliphatic and aromatic, unsubstituted or N-mono-, N,N-and N,N'-dialkyl-substituted diamines having from 1 to 4 carbon atoms in the alkyl moiety, such as unsubstituted or mono- or dialkyl-substituted ethylenediamine, diethylenetriamine, triethylenetetramine, 1,3-propylenediamine, 1,3- and 1,4-butylenediamine, 1,2-, 1,3-, 1,4-, 1,5- and 1,6-hexamethylenediamine, phenylenediamines, 2,3-, 2,4- and 2,6-tolylenediamine and 4,4'-, 2,4'- and 2,2'-diaminodiphenylmethane.

Other suitable initiator molecules are alkanolamines, e.g. ethanolamine, N-methyl- and N-ethylethanolamine, dialkanolamines, e.g. diethanolamine, N-methyl- and N-ethyl-diethanolamine, and trialkanolamines e.g. triethanolamine, and ammonia. Preference is given to polyhydric alcohols, in particular dihydric and/or trihydric alcohols, such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose.

The polyether-polyols, preferably polyoxypropylene- and polyoxypropylene-polyoxyethylene-polyols, have a functionality of from 2 to 6, in particular from 2 to 4, and molecular weights of from 400 to 8000, preferably from 1200 to 6000, in particular from 1800 to 4000, and suitable polyoxytetramethylene glycols have a molecular weight of up to approximately 3500.

Other suitable polyether-polyols are polymer-modified polyether-polyols, preferably graft polyetherpolyols, in particular those based on styrene and/or acrylonitrile and prepared by in-situ polymerization of acrylonitrile, styrene or preferably mixtures of styrene and acrylonitrile, for example in a weight ratio of from 90:10 to 10:90, preferably from 70:30 to 30:70, expediently in the abovementioned polyether-polyols by a method similar to that of German Patents 11 11 394, 12 22 669 (U.S. Pat. Nos. 3,304,273, 3,383,351 and 3,523,093), 11 52 536 (GB 1,040,452) and 11 52 537 (GB 987,618), and polyether-polyol dispersions which contain, as the disperse phase, usually in an amount of from 1 to 50% by weight, preferably from 2 to 25% by weight, for example polyureas, polyhydrazides, polyurethanes containing tertamino groups in bound form, and/or melamine and are described, for example, in EP-B-011 752 (U.S. Pat. No. 4,304,708), US-A-4,374,209 and DE-A-32 31 497.

Like the polyester-polyols, the polyether-polyols can be used individually or in the form of mixtures. Furthermore, they may be mixed with the graft polyether-polyols or polyester-polyols and the hydroxyl-containing polyester-amides, polyacetals, polycarbonates and-/or polyether-polyamines.

Examples of suitable hydroxyl-containing polyacetals are the compounds which can be prepared from glycols, such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a conventional type, which can be prepared, for example, by reacting diols, such as 1,3-propanediol, 1,4-butanediol and/or 1,6-hexanediol, diethylene glycol, triethylene glycol or tetraethylene glycol, with diaryl carbonates, e.g. diphenyl carbonate, or phosgene.

The polyester-amides include, for example, the predominantly linear condensates obtained from polybasic, saturated and/or unsaturated carboxylic acids or anhydrides thereof and polyhydric, saturated and/or unsaturated amino alcohols, or mixtures of polyhydric alcohols and amino alcohols and/or polyamines.

Suitable polyether-polyamines can be prepared from the abovementioned polyether-polyols by known processes. The examples which may be mentioned are the cyanoalkylation of polyoxyalkylene-polyols and a subsequent hydrogenation of the resultant nitrile (U.S. Pat. No. 3,267,050) or the partial or complete amination of polyoxyalkylene-polyols using amines or ammonia in the presence of hydrogen and catalysts (DE 1 215 373).

Polyol compounds which have proven particularly successful and are therefore preferably used are mixtures expediently containing, based on 100 parts by weight:

bi) from 0 to 95 parts by weight, preferably from 20 to 80 parts by weight, of a sucrose-initiated polyether-polyol having a hydroxyl number of from 300 to 500, preferably from 350 to 450, based on 1,2-propylene oxide or 1,2-propylene oxide and ethylene oxide, bii) from 0 to 15 parts by weight, preferably from 5 to 15 parts by weight, of a sorbitol-initiated polyether-polyol having a hydroxyl number of from 400 to 600, preferably from 450 to 550, based on 1,2-propylene oxide or 1,2-propylene oxide and ethylene oxide, biii) from 0 to 20 parts by weight, preferably from 5 to 15 parts by weight, of an ethylenediamine-initiated polyether-polyol having a hydroxyl number of from 700 to 850, preferably from 750 to 800, based on 1,2-propylene oxide, and biiii) from 0 to 60 parts by weight, preferably from 5 to 40 parts by weight, of a polyether-polyol having a hydroxyl number of from 400 to 600, preferably from 450 to 550, based on 1,2-propylene oxide or 1,2-propylene oxide and ethylene oxide and prepared using a mixture of sucrose and triethanolamine in a weight ratio of from 1:2 to 2:1 as initiator molecules.

c) The rigid polyurethane foams may be prepared with or without the use of chain extenders and/or crosslinking agents. However, it may prove advantageous, in order to modify the mechanical properties, for example the hardness, to add chain extenders, crosslinking agents or, if desired, mixtures thereof. The chain extenders and/or crosslinking agents used are diols and/or triols, having a molecular weight of less than 400, preferably from 60 to 300. Examples are aliphatic, cycloaliphatic and/or araliphatic diols having from 2 to 14 carbon atoms, preferably from 4 to 10 carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl)hydroquinone, triols, such as 1,2,4- and 1,3,5-trihydroxycyclohexane, glycerol and trimethylolpropane, and low-molecular-weight hydroxyl-containing polyalkylene oxides, based on ethylene oxide and/or 1,2-propylene oxide, and the abovementioned diols and/or triols as initiator molecules.

Any chain extenders, crosslinking agents or mixtures thereof used to prepare the rigid polyurethane foams are expediently used in an amount of from 0 to 20% by weight, preferably from 2 to 8% by weight, based on the weight of the polyol compound (b).

d) The novel blowing agent mixtures of the above-described highly fluorinated and/or perfluorinated organic compounds (d1), the cyclopentane (d2) and, if desired, an aliphatic and/or further cycloaliphatic hydrocarbon (d3) and in particular the highly fluorinated and/or perfluorinated compounds (d1) are, for processing in the process according to the invention, preferably emulsified in the starting components (a), (b) or in mixtures of (b) and (c) or in (a) and (b). Suitable emulsifiers for achieving blowing agent-containing emulsions of this type are those known from polyurethane chemistry. The emulsifiers employed are in particular oligomeric acrylates containing bonded polyoxyalkylene and fluoroalkane radicals as side groups and having a fluorine content of from approximately 5 to 30% by weight. Oligomeric acrylates of this type are sufficiently known from polymer chemistry (cf., inter alia, EP-A-351 614).

The oligomeric acrylates containing polyoxyalkylene and fluoroalkane radicals as side groups which are suitable, for example, as emulsifier are expediently employed in an amount of from 0.01 to 6 parts by weight, preferably from 0.2 to 3.5 parts by weight, in particular from 0.5 to 2.0 parts by weight, based on 100 parts by weight of the starting components (a), (b) or the mixture of (b) and (c).

As stated above, the organic and/or modified organic polyisocyanates (a) and the relatively high-molecular-weight compounds containing at least two reactive hydrogen atoms (b) are suitable for emulsifying the blowing agent mixture (d). Also suitable are mixtures of (b) and low-molecular-weight chain extenders and/or crosslinking agents (c).

If the other emulsion phase used comprises organic and/or modified organic polyisocyanates (a), preference is given to aromatic polyisocyanates selected from the group consisting of 2,4- and 2,6-tolylene diisocyanates or mixtures of said isomers, 4,4'-, 2,4'- and 2,2'-diphenylmethane diisocyanates or mixtures of at least two of said isomers, and mixtures of diphenylmethane diisocyanates and polyphenylpolymethylene polyisocyanates. If the organic polyisocyanates are crystalline at room temperature, they are liquefied by mixing with liquid polyisocyanates and/or by suitable partial modification, e.g. carbodiimidization and/or urethanization.

However, the other emulsion phase is preferably the relatively high-molecular-weight compounds containing at least two reactive hydrogen atoms (b). Particularly suitable are polyester-polyols or mixtures thereof having a functionality of from 2 to 3 and a molecular weight of from 480 to 3000 and polyether-polyols or mixtures thereof having a functionality of from 2 to 6 and a molecular weight of from 400 to 8000, these expediently being selected from the group consisting of polyoxyethylenepolyols, polyoxypropylene-polyols, polyoxypropylenepolyoxyethylene-polypols and polyoxytetramethylene glycols, or mixtures thereof.

The blowing agent-containing emulsions according to the invention thus preferably contain or comprise at least one highly fluorinated and/or perfluorinated organic compound (d1) and cyclopentane (d2) in a (d1):(d2) mixing ratio of from 10-40:90-60, and at least one organic and/or modified organic polyisocyanate (a) or at least one relatively highmolecular-weight compound containing at least two reactive hydrogen atoms (b) or at least one low-molecular-weight chain extender and/or crosslinking agent (c) or a mixture of (b) and (c).

Blowing agent-containing emulsions which have proven particularly successful are those which comprise 5–15 parts by weight, based on 100 parts by weight of (b) or (b) and (c), of a novel blowing agent mixture (d) of components (d1), (d2) and, if desired (d3), as described above, 0–5 parts by weight, preferably from 0.5 to 3 parts by weight, based on 100 parts by weight of (b) or (b) and (c), of water, and at least one relatively high-molecular-weight compound containing at least two reactive hydrogen atoms (b), or mixtures of (b) and low-molecular-weight chain extenders and/or crosslinking agents (c) and the emulsifier.

To prepare the blowing agent-containing emulsions, the starting components (a) or (b) or a mixture of (b) and (c) and the blowing agent mixture are mixed vigorously, expediently in the presence of an emulsifier, preferably an oligomeric acrylate, at from 0° to 70° C., preferably from 20° to 40° C. Examples of suitable mixing units for this purpose are static mixers, e.g. an SMX from Sulzer (Switzerland), or dynamic mixers, e.g. propeller stirrers or Ultra-Turrax ® from Hanke und Kunkel (Germany).

e) The catalysts (e) used to produce the rigid polyurethane foams are, in particular, compounds which greatly accelerate the reaction of the compounds of component (b) which contain reactive hydrogen atoms, in particular hydroxyl groups, used, (c) with the organic, modified or unmodified polyisocyanate (a). Suitable compounds are organometallic compounds, preferably organotin compounds, such as tin(II) salts of organic carboxylic acids, e.g. tin(II) acetate, tin(II) octanoate, tin(II) ethylhexanoate and tin(II) laurate, and dialkyltin(IV) salts of organic carboxylic acids, e.g. dibutyltin diacetate, dibutyltin dilaurate, dibutyltin maleate and dioctyltin diacetate. The organometallic compounds are employed alone or preferably in combination with highly basic amines, for example amidines, such as 2,3-dimethyl-3,4,5,6-tetrahydropyrimidine, tertiary amines, such as triethylamine, tributylamine, dimethylbenzylamine, N-methyl-, N-ethyl-, N-cyclohexyl-morpholine, N,N,N',N'-tetramethylethylene-diamine, N,N,N',N'tetramethylbutanediamine, N,N,N',N'-tetramethyl-1,6-hexanediamine, pentamethyldiethylene-triamine, tetramethyldiaminoethyl ether, bis(dimethylaminopropyl)urea, dimethylpiperazine, 1,2-dimethylimidazole, 1-azabicyclo[3.3.0]-octane and, preferably, 1,4-diazabicyclo[2.2.2]octane and alkanolamine compounds such as triethanolamine, triisopropanolamine, N-methyl- and N-ethyldiethanolamine and dimethylethanolamine.

Other suitable catalysts are tris(dialkylaminoalkyl)-s-hexahydrotriazines, in particular tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides, such as sodium methoxide and potassium isopropoxide, and alkali metal salts of long-chain fatty acids having from 10 to 20 carbon atoms and possibly containing lateral OH groups. From 0.001 to 5% by weight, in particular from 0.05 to 2% by weight, of catalyst or catalyst combination is preferably used, based on the weight of component (b).

f) If desired, assistants and/or additives (f) can be incorporated into the reaction mixture for the production of the rigid polyurethane foams. Specific examples are surfactants, foam stabilizers, cell regulators, fillers, dyes, pigments, flameproofing agents, hydrolysis-protection agents, and fungistatic and bacteriostatic substances.

Examples of suitable surfactants are compounds which serve to support homogenization of the starting materials and may also regulate the cell structure of the plastics. Specific examples are emulsifiers, such as the sodium salts of castor oil sulfates, or of fatty acids, and the salts of fatty acids with amines, for example diethylamine oleate, diethanolamine stearate and diethanolamine ricinoleate, salts of sulfonic acids, e.g. alkali metal salts or ammonium salts of dodecylbenzene- or dinaphthylmethanedisulfonic acid and ricinoleic acid; foam stabilizers, such as siloxane-oxyalkylene copolymers and other organopolysiloxanes, oxyethylated alkylphenols, oxyethylated fatty alcohols, paraffin oils, castor oil esters, ricinoleic acid esters, Turkey red oil and groundnut oil, and cell regulators, such as paraffins, fatty alcohols and dimethylpolysiloxanes. Suitable compounds for improving the emulsification action, the cell structure and/or stabilizing the foam are furthermore the above-described oligomeric acrylates containing polyoxyalkylene and fluoroalkane radicals as side groups. The surfactants are usually used in amounts of from 0.01 to 5 parts by weight, based on 100 parts by weight of component (b).

For the purposes of the invention, fillers, in particular reinforcing fillers, are conventional organic and inorganic fillers, reinforcing agents, weighting agents, agents for improving abrasion resistance in paints, coating agents, etc. Specific examples are inorganic fillers, such as silicate minerals, for example sheet silicates, such as antigorite, serpentine, hornblendes, amphiboles, chrysotile, and talc; metal oxides, such as kaolin, aluminum oxides, titanium oxides and iron oxides, metal salts, such as chalk, baryte and inorganic pigments, such as cadmium sulfide, zinc sulfide and glass, inter alia. Preference is given to kaolin (china clay), aluminum silicate and coprecipitates of barium sulfate and aluminum silicate, and natural and synthetic fibrous minerals, such as wollastonite, and metal and, in particular, glass fibers of various lengths, which may be sized. Examples of suitable organic fillers are carbon, melamine, colophony, cyclopentadienyl resins and graft polymers, and cellulose fibers, polyamide fibers, polyacrylonitrile fibers, polyurethane fibers, and polyester fibers based on aromatic and/or aliphatic dicarboxylic acid esters, and in particular carbon fibers.

The inorganic and organic fillers may be used individually or as mixtures and are advantageously introduced into the reaction mixture in amounts of from 0.5 to 50% by weight, preferably from 1 to 40% by weight, based on the weight of components (a) to (c), but the content of mats, nonwovens and wovens made from natural and synthetic fibers may reach values of up to 80% by weight.

Examples of suitable flameproofing agents are tricresyl phosphate, tris(2-chloroethyl) phosphate, tris(2-chloropropyl) phosphate, tris(1,3-dichloropropyl) phosphate, tris(2,3-dibromopropyl) phosphate, tetrakis(2-chloroethyl)ethylene diphosphate, dimethyl methanephosphonate, diethyl diethanolaminomethylphosphonate and commercially available halogen-containing flameproofing polyols.

In addition to the abovementioned halogensubstituted phosphates, it is also possible to use inorganic or organic flameproofing agents, such as red phosphorus, aluminum oxide hydrate, antimony trioxide, arsenic oxide, ammonium polyphosphate and calcium sulfate, expandable graphite or cyanuric acid derivatives, e.g. melamine, or mixtures of two or more flameproofing agents, e.g. ammonium polyphosphates and melamine, and, if desired, corn starch, or ammonium polyphosphate, melamine and expandable graphite and/or, if desired, aromatic polyesters, in order to flameproof the polyisocyanate polyaddition products. In general, it has proven expedient to use from 5 to 50 parts by weight, preferably from 5 to 25 parts by weight, of said flameproofing agents per 100 parts by weight of component (b).

Further details on the other conventional assistants and additives mentioned above can be obtained from the specialist literature, for example from the monograph by J. H. Saunders and K. C. Frisch, High Polymers, Volume XVI, Polyurethanes, Parts 1 and 2, Interscience Publishers, 1962 and 1964 respectively, or Kunststoff-Handbuch, Polyurethane, Volume VII, Hanser-Verlag, Munich, Vienna, 1st and 2nd Editions, 1966 and 1983.

To produce the rigid polyurethane foams, the organic polyisocyanate (a), the relatively high-molecular-weight compound containing at least two reactive hydrogen atoms (b) and, if used, the chain extender and/or crosslinking agent (c) are reacted in such amounts that the ratio between the number of equivalents of NCO groups in the polyisocyanate (a) and the total number of reactive hydrogen atoms in component (b) and, if used, (c) is from 0.85 to 1.25:1, preferably from 0.95 to 1.15:1 and in particular 1 to 1.05:1. If the rigid polyurethane foams, at least in part, contain bonded isocyanurate groups, a ratio between the number of NCO groups in the polyisocyanate (a) and the total number of reactive hydrogen atoms in component (b) and, if used, (c) of from 1.5 to 60:1, preferably from 1.5 to 8:1, is usually used.

The rigid polyurethane foams are advantageously produced by the one-shot process, for example using the high-pressure or low-pressure method, in an open or closed mold, for example in a metallic mold. It has proven particularly advantageous to use the two-component method and to combine the starting components (b), (d), (e) and, if used, (c) and (f) in component (A) and to use the organic or modified polyisocyanate (a) or a mixture of said polyisocyanates and, if used, the blowing agent (d) as component (B).

The starting components are mixed at from 15° to 90° C., preferably at from 20° to 60° C. in particular from 20° to 35° C., and introduced into the open or closed mold, if desired under super-atmospheric pressure. The mixing can, as stated above, be carried out mechanically by means of a stirrer or a stirring screw. The mold temperature is expediently from 20° to 110° C., preferably from 30° to 60° C., in particular from 45° to 50° C.

The rigid polyurethane foams or rigid molded materials produced by the process according to the invention have a density of from 0.02 to 0.75 g/cm³, preferably from 0.025 to 0.24 g/cm³, in particular from 0.03 to 0.1 g/cm³. They are particularly suitable as insulating materials in the construction and refrigeration sectors, for example as the middle layer in sandwich elements or for foam-filling refrigerator and freezer housings.

EXAMPLES

Example 1 a) Preparation of the base mixture (component A below)

15.5 parts by weight of a polyether-diol having a hydroxyl number of 105, prepared from 1,2-propanediol and 1,2-propylene oxide, 2.6 parts by weight of polysiloxane foam stabilizer (Tegostab® B 8406 from Goldschmidt AG, Essen) and 2.5 parts by weight of N,N-dimethylcyclohexylamine are admixed with 79.0 parts by weight of a polyether-polyol having a hydroxyl number of 400 and prepared from sucrose as initiator molecule and 1,2-propylene oxide.

b) Preparation of the blowing agent-containing emulsion

The water content of component A was adjusted to 2.9% by weight, based on component A, by addition of water. 3 parts by weight of perfluorohexane and 5.2 parts by weight of cyclopentane were admixed with 100 parts by weight of the water-containing component A with vigorous stirring. A milky, cloudy emulsion which was stable at room temperature for 4–5 days was obtained.

c) Production of the foam 108.2 parts by weight of the blowing agent-containing emulsion prepared as described in b) were mixed with 142 parts by weight of a mixture of diphenylmethane diisocyanates and polyphenyl-polymethylene polyisocyanates having an NCO content of 31% by weight (Lupranat® M20S from BASF Aktiengesellschaft) at 23° C. with vigorous stirring, and the foamable reaction mixture was transferred into an open mold where it was allowed to expand. A very fine-celled rigid polyurethane foam having a density of 28 g/l, containing 90% of closed cells and having a specific thermal conductivity of 18.6 mW/mK, was obtained.

Comparative Example

The procedure was similar to that of Example 1, with the difference that the cyclopentane was replaced by n-pentane. A foam having a specific thermal conductivity of 20.6 mW/mK was obtained.

Example 2

Component A was prepared as in Example 1a. The water content of component A was adjusted to 2.4% by weight by addition of water. 3 parts by weight of perfluorocyclohexane and 6.5 parts by weight of cyclopentane were admixed with 100 parts by weight of the water-containing component A with vigorous stirring. A milky, cloudy emulsion was produced.

The rigid polyurethane foam was produced as in Example 1c, 109.5 parts by weight of the emulsion being reacted with 136 parts by weight of Lupranat M20S. A fine-celled rigid polyurethane foam having a density of 28 g/l, containing more than 90% of closed cells and having a specific thermal conductivity of 18.4 mW/mK, was produced.

Example 3

Component A was prepared as in Example 1a. The water content of component A was adjusted to 2.0% by weight by addition of water. 3 parts by weight of perfluorocyclohexane and 7.7 parts by weight of cyclopentane were admixed with 100 parts by weight of the water-containing component A with vigorous stirring. A milky, cloudy emulsion was formed.

The foam was produced as in Example 1c, 110.7 parts by weight of the emulsion being reacted with 129 parts by weight of Lupranat M20S.

A fine-celled rigid polyurethane foam having a density of 28 g/l, containing more than 90% of closed cells and having a specific thermal conductivity of 18.1 mW/mK, was produced.

Example 4

Component A was prepared as in Example 1a. The water content of component A was adjusted to 2.2% by weight by admixing water. 1.4 parts by weight of perfluorohexane and 7.6 parts by weight of cyclopentane were admixed with 100 parts by weight of the water-containing component A with vigorous stirring. A milky emulsion was formed.

The foam was produced as in Example 1c, 109 parts by weight of the emulsion being reacted with 131 parts by weight of Lupranat M20S. A fine-celled rigid polyurethane foam having a density of 28 g/l, containing more than 90% of closed cells and having a specific thermal conductivity of 18.3 mW/mK, was produced.

Example 5

Component A was prepared as in Example 1a. The water content of component A was adjusted to 2.6% by weight by addition of water. 3 parts by weight of perfluorohexane and 7 parts by weight of cyclopentane were added to 100 parts by weight of the water-containing component A with vigorous stirring. The foam was produced as in Example 1c, 110 parts by weight of the emulsion being reacted with 139 parts by weight of Lupranat M20S. A fine-celled rigid polyurethane foam having a density of 28 g/l, containing more than 90% of closed cells and having a specific thermal conductivity of 18.5 mW/mK, was produced.

EXAMPLE 6

Component A was prepared as in Example 1a. The water content of component A was adjusted to 2.6% by weight by addition of water. 3 parts by weight of perfluorohexane, 4.9 parts by weight of cyclopentane, 1.5 parts by weight of isohexane and 0.6 part by weight of n-pentane were admixed with 100 parts by weight of the water-containing component A with vigorous stirring. A milky, cloudy, stable emulsion was formed.

The foam was produced as in Example 1c, 110 parts by weight of the emulsion being reacted with 139 parts by weight of Lupranat M20S.

A fine-celled rigid polyurethane foam having a density of 28 g/l, containing more than 90% of closed cells and having a specific thermal conductivity of 17.5 mW/mK, was produced.

We claim:

1. A process for the production of rigid polyurethane foams by reacting a) organic and/or modified organic polyisocyanates with b) at least one relatively high-molecular-weight compound containing at least two reactive hydrogen atoms, and, if desired, c) low-molecular-weight chain extenders and/or crosslinking agents, in the presence of d) blowing agents, e) catalysts and, if desired, f) assistants and/or additives, which comprises using, as blowing agent (d), a mixture of (d1) from 5 to 40% by weight of at least one highly fluorinated and/or perfluorinated organic compound, said highly fluorinated organic compound being at least 85% fluorinated, (d2) from 30 to 95% by weight of cyclopentane and (d3) from 0 to 45% by weight of at least one aliphatic and/or cycloaliphatic hydrocarbon having 4 to 8 carbon atoms.

2. A process as claimed in claim 1, wherein the blowing agent (d) is employed in an amount of from 5 to 15% by weight, based on the relatively high-molecular-weight compound (b).

3. A process as claimed in claim 1, wherein the blowing agent (d) is emulsified in the organic and/or modified organic polyisocyanate (a).

4. A process as claimed in claim 1, wherein the blowing agent (d) is emulsified in the relatively high-molecular-weight compound containing at least two reactive hydrogen atoms (b).

5. A process as claimed in claim 1, wherein the amount of component (d1) is from 40 to 90 percent by weight based on mixture (d), and the amount of component (d3) is at least 5 percent by weight, based upon the mixture (d).

6. A process as claimed in claim 1, wherein the mixture (d) comprises solely components (d1) and (d2) in a weight ratio of 10:90 to 40:60, respectively.

7. A process as claimed in claim 1, further comprising water as a blowing agent in an amount of 0.5 to 3 percent by weight based on the weight of component (b).

8. A process as claimed in claim 1, wherein the mixture (d1) is mixed with component (a) or component (b) in the presence of an emulsifier comprising an oligomeric acrylate.

9. A process as claimed in claim 1, wherein (d1) consists of an aliphatic or cycloaliphatic hydrocarbon liquid at room temperature.

10. A process as claimed in claim 9, wherein the aliphatic or cycloaliphatic hydrocarbon liquid at room temperature has 5 to 8 carbon atoms.

11. A process as claimed in claim 10, wherein the liquid hydrocarbon has from 5 to 6 carbon atoms.

12. A process as claimed in claim 1, wherein the organic compound consists of a linear or cyclic ether having 4 to 12 carbon atoms.

13. A process as claimed in claim 12, wherein the ether is linear and has 4 to 6 carbon atoms.

* * * * *